Patented Apr. 17, 1928.

1,666,800

UNITED STATES PATENT OFFICE.

ANTON EDUARD VAN ARKEL AND JAN HENDRIK DE BOER, OF EINDHOVEN, NETHERLANDS, ASSIGNORS TO N. V. PHILIPS' GLOEILAMPENFABRIEKEN, OF EINDHOVEN, NETHERLANDS.

PROCESS OF SEPARATING HAFNIUM AND ZIRCONIUM.

No Drawing. Application filed November 11, 1924, Serial No. 749,332, and in the Netherlands December 12, 1923.

This process has reference to a separation of a mixture of hafnium and zirconium compounds. Applicants have found that the phosphates, phosphites, arsenates, arsenites, antimonates or antimonites of hafnium and zirconium can be converted into soluble hafnium and zirconium compounds in a medium containing free hydrofluoric acid. Starting, for example, with a mixture of hafnium and zirconium orthophosphates, these orthophosphates can be converted into complex soluble hafnium and zirconium acids with the aid of hydrofluoric acid. In this case, the anion of the said complex acids contains, apparently, phosphorous, fluorine and hafnium, respectively, zirconium.

These complex acids may be prepared not only by adding hydrofluoric acid to hafnium resp. zirconium orthophosphate, but also by adding to a soluble hafnium resp. zirconium compound hydrofluoric acid and phosphoric acid or generally a liquid containing free hydrofluoric acid and free phosphoric acid.

In a similar manner the complex acids can be prepared that are derived from the meta and pyro phosphates, phosphites, arsenates, arsenites, antimonates and antimonites of hafnium and zirconium. Obviously, the complex acids may be prepared in many other ways not especially mentioned herein.

By replacing the cation in the complex acids with metals, salts of the complex acids are formed. These salts can be prepared by treating the phosphates, phosphites, arsenates, arsenites, antimonates and antimonites of hafnium and zirconium with a fluoride, for example with a bi-fluoride in an acid medium.

In the following under the solution of the complex compounds is to be understood the solution which can be prepared by adding in an acid medium fluorine ions and cations corresponding to the cations of the desired complex compounds to a mixture of the hafnium and zirconium salts that can be derived from the at least trivalent oxides of the elements the atomic number of which is $18n-3$ if n is a whole number and at most 3.

According to the invention, hafnium and zirconium compounds are separated by starting with the solution of the complex compounds which can be prepared by treating the phosphates, phosphites, arsenates, arsenites, antimonates and antimonites of hafnium and zirconium with a fluoride, for example, with a bifluoride in an acid medium and submitting the solution of said complex compounds to fractional separation.

The process according to the invention will be more clearly understood by reference to some examples. It deserves to be noticed that the percentages of hafnium which will be mentioned in the examples, refer to the sum of hafnium and zirconium metal that is present. If, therefore, it is mentioned that the mixture, for example, of hafnium and zirconium phosphate contains 12% of hafnium, this will be understood to mean that the quantities of hafnium and zirconium occur in the said mixture in the proportion 12:88.

I. If a solution of the mixture of the complex acids containing hafnium and prepared by adding hydrofluoric acid to the orthophosphates of hafnium and zirconium, which mixture contains 12% of hafnium, is evaporated to such an extent that half of the complex acids is separated by crystallization, the separated fraction will contain about 16% of hafnium, whereas the mother lye contains only about 8% of hafnium.

II. The ammonium salts of the complex acids prepared by starting with the orthophosphates of hafnium and zirconium can be prepared by introducing a mixture of hafnium and zirconium orthophosphates into a solution of ammonium bifluoride. If, from the thus obtained solution of the ammonium salts, which contains 12% of hafnium, the third part of the salts is precipitated by crystallization, the crystals thus formed may contain at the utmost 24% of hafnium. If then half of the compounds still present is separated by crystallization from the mother lye, the crystals thus produced may contain at the utmost 8% of hafnium, whereas the mother lye contains only about 3% of hafnium.

III. Whereas the hafnium compound of the ammonium salts of the complex acids prepared by starting with the orthophosphates of hafnium and zirconium is least soluble, it is stated that by starting with the solution of the complex lithium salts containing about 12% of hafnium, the hafnium compound on the contrary accumulates in the mother liquor.

IV. If the solution of the barium salts of the complex acids containing 12% of hafnium, is submitted to fractional crystallization, the motor lye is found to be substantially free from hafnium.

V. In contradistinction with the above examples, in which the orthophosphates of hafnium and zirconium are employed as the starting material, an example may be given in which an orthoarsenate of hafnium and zirconium is used as the starting material. The solution of the complex ammonium salts may be prepared by adding ammonium bifluoride to the orthoarsenates of hafnium and zirconium. When crystallizing the thus obtained solution, the hafnium compound is found to accumulate in the mother liquor. In starting with the solution of a mixture containing originally 3% of hafnium and in separating by crystallization two-third parts of the ammonium salts, the separated fraction is found to be almost free from hafnium, whereas the mother lye contains about 8% of hafnium.

As in the said complex compounds one molecule $P_2O_5$ occurs associated with one molecule $ZrO_2$, as appears from the chemical analysis, and as in the orthophosphates such as they are formed in the precipitation of a hafnium resp. zirconium compound with the aid of orthophosphoric acid, one molecule $ZrO_2$ mostly occurs associated with less than one molecule $P_2O_5$, other hafnium, resp. zirconium compounds will be produced in addition to the said complex compounds when the latter are formed from the said orthophosphates, said hafnium or zirconium compounds containing relatively less or eventually no phosphorus. It is also possible that, if the solution of the complex compounds are recrystallized, said compounds are partly decomposed by hydrolysis. If it is desired to separate, for example by fractional crystallization of the solution of the ammonium salts of the complex acids of hafnium resp. zirconium, also ammonium-hafnium fluoride resp. ammonium-zirconium fluoride may occur by reason of hydrolysis. The presence of these compounds which contain less phosphorus is found to be not harmful to the separation of the complex compounds of hafnium and zirconium. They are otherwise easily removed.

What we claim as our invention is:

1. The process of separating compounds of hafnium and zirconium, characterized by starting from the solution of the complex compounds that can be prepared by adding in an acid medium fluorine ions and cations corresponding to the cations of the desired complex compounds to a mixture of hafnium and zirconium salts, which can be derived from the at least trivalent oxides of the elements the atomic number of which is 18n—3 if n is a whole number and at most 3, and that the solution of said complex compounds is submitted to fractional separation.

2. The process of separating compounds of hafnium and zirconium characterized by starting from the solution of the complex compounds that can be prepared by adding in an acid medium fluorine ions and cations corresponding to the cations of the desired complex compounds to a mixture of hafnium and zirconium salts, which can be derived from the at least trivalent oxides of the elements the atomic number of which is 18n—3 if n is a whole number and at most 3, and that the solution of said complex compounds is submitted to fractional crystallization.

3. The process of separating compounds of hafnium and zirconium, characterized by starting from the solution of the complex compounds that can be prepared by adding in an acid medium fluorine ions and ammonium irons to a mixture of hafnium and zirconium salts, which can be derived from the at least trivalent oxides of the elements, the atomic number of which is 18n—3 if n is a whole number and at most 3, and that the solution of said complex compounds is submitted to fractional separation.

4. The process of separating compounds of hafnium and zirconium, characterized by starting from the complex solution of the compounds that can be prepared by adding in an acid medium fluorine ions and ammonium ions to a mixture of hafnium and zirconium salts, which can be derived from the at least trivalent oxides of the elements the atomic number of which is 18n—3 if n is a whole number and at most 3 and that the solution of said complex compounds is submitted to fractional crystallization.

5. The process of separating compounds of hafnium and zirconium characterized by starting from the solution of the complex compounds that can be prepared by adding hydrofluoric acid to a mixture of hafnium and zirconium orthophosphates, and that the solution of said complex compounds is submitted to fractional separation.

6. The process of separating compounds of hafnium and zirconium, characterized by starting from the solution of the complex compounds that can be prepared by adding hydrofluoric acid to a mixture of hafnium and zirconium orthophosphates, and that the solution of said complex compounds is submitted to fractional crystallization.

In testimony whereof we affix our signatures, at the city of Eindhoven, this 22nd day of September A. D. 1924.

ANTON EDUARD van ARKEL.
JAN HENDRIK de BOER.